United States Patent
Alkadban

(10) Patent No.: US 8,857,323 B1
(45) Date of Patent: Oct. 14, 2014

(54) PROTECTIVE DEVICE FOR PREVENTING FLARE-UPS FROM CONTACTING FOOD DURING COOKING

(76) Inventor: Abdulkareem F. Alkadban, Puyallup, WA (US)

( * ) Notice: Subject to any disclaimer, the term of this patent is extended or adjusted under 35 U.S.C. 154(b) by 146 days.

(21) Appl. No.: 13/347,319

(22) Filed: Jan. 10, 2012

Related U.S. Application Data

(60) Provisional application No. 61/431,184, filed on Jan. 10, 2011.

(51) Int. Cl.
*A47J 27/00* (2006.01)

(52) U.S. Cl.
USPC .............................. 99/444; 99/449

(58) Field of Classification Search
CPC ....... A47J 37/0786; A47J 37/08; A47J 37/06; A47J 37/0763; A47J 27/04; A01J 25/002; A21B 3/155; A21B 1/52; A23B 7/144; F24C 15/08; F24C 3/027; F24C 3/14; F24B 1/003; F24B 1/207; F23H 13/00; F23L 9/00; B65D 1/0292; B65D 7/26; B65D 90/24; B65D 1/20; B65D 25/14; B65D 2581/3421
USPC ........... 99/400, 401, 440, 444, 446, 439, 450, 99/460, 467; 219/727; 126/19 R, 19 M, 126/273 R, 275 R, 276, 1 R, 29, 9 R, 21 A, 126/41 C, 20, 25 R, 337 R, 39 R, 40, 163 R, 126/163 A, 152 B; 220/6, 571, 601, 62.13, 220/62.17, 666
See application file for complete search history.

(56) References Cited

U.S. PATENT DOCUMENTS

| | | | | |
|---|---|---|---|---|
| 532,408 A | * | 1/1895 | Wesley | 126/275 R |
| 704,300 A | * | 7/1902 | Dahman | 126/275 R |
| 1,339,601 A | * | 5/1920 | Maehler | 110/336 |
| 2,048,769 A | * | 7/1936 | Anderson | 126/25 R |
| 2,307,914 A | * | 1/1943 | Bitney | 126/9 R |
| 2,685,316 A | * | 8/1954 | Krasno | 206/524.8 |
| 3,308,807 A | * | 3/1967 | Little et al. | 126/275 R |
| 3,331,684 A | | 7/1967 | Storchheim | |
| 3,666,642 A | | 5/1972 | Alwan et al. | |
| 3,959,620 A | * | 5/1976 | Stephen, Jr. | 219/386 |
| 5,094,222 A | * | 3/1992 | Fukuda et al. | 126/19 R |
| 5,165,328 A | * | 11/1992 | Erickson et al. | 99/330 |
| 5,301,826 A | * | 4/1994 | Sandahl | 220/4.26 |
| 5,542,560 A | * | 8/1996 | Gerster et al. | 220/252 |

(Continued)

OTHER PUBLICATIONS

Reynolds Kitchens. Frequently Asked Questions. http://www.reynoldspkg.com/reynoldskitchens/en/faq_detail.asp?info_page_id=752[]_id=1795&cat_id=1337.

*Primary Examiner* — Geoffrey S Evans
*Assistant Examiner* — Kuangyue Chen
(74) *Attorney, Agent, or Firm* — Robert C. Montgomery; Montgomery Patent & Design

(57) ABSTRACT

A foil cooking enclosure for containing foodstuffs while grilling or cooking comprising a hinged access door for loading and unloading the enclosure. The enclosure is constructed using semi-rigid end portions comprising wire frames which are covered with a metallic foil sheet and filled to obtain structural integrity. Said end portions are interconnected by a collapsible pleated sheet for compact packaging and storage. A lower surface of the enclosure comprises a perforated base structure for draining fluid runoff in a manner which inhibits flare ups and return of noxious vapors into the foodstuffs upon contact with a grill flame or a cooking surface.

18 Claims, 3 Drawing Sheets

(56) References Cited

U.S. PATENT DOCUMENTS

| | | | |
|---|---|---|---|
| 5,605,142 A * | 2/1997 | Parker | 126/9 B |
| 6,060,701 A * | 5/2000 | McKee et al. | 219/681 |
| 2004/0061949 A1 * | 4/2004 | Yakita et al. | 359/697 |
| 2007/0199555 A1 * | 8/2007 | Gregory | 126/9 R |
| 2008/0246379 A1 * | 10/2008 | Choudhary et al. | 312/400 |

* cited by examiner

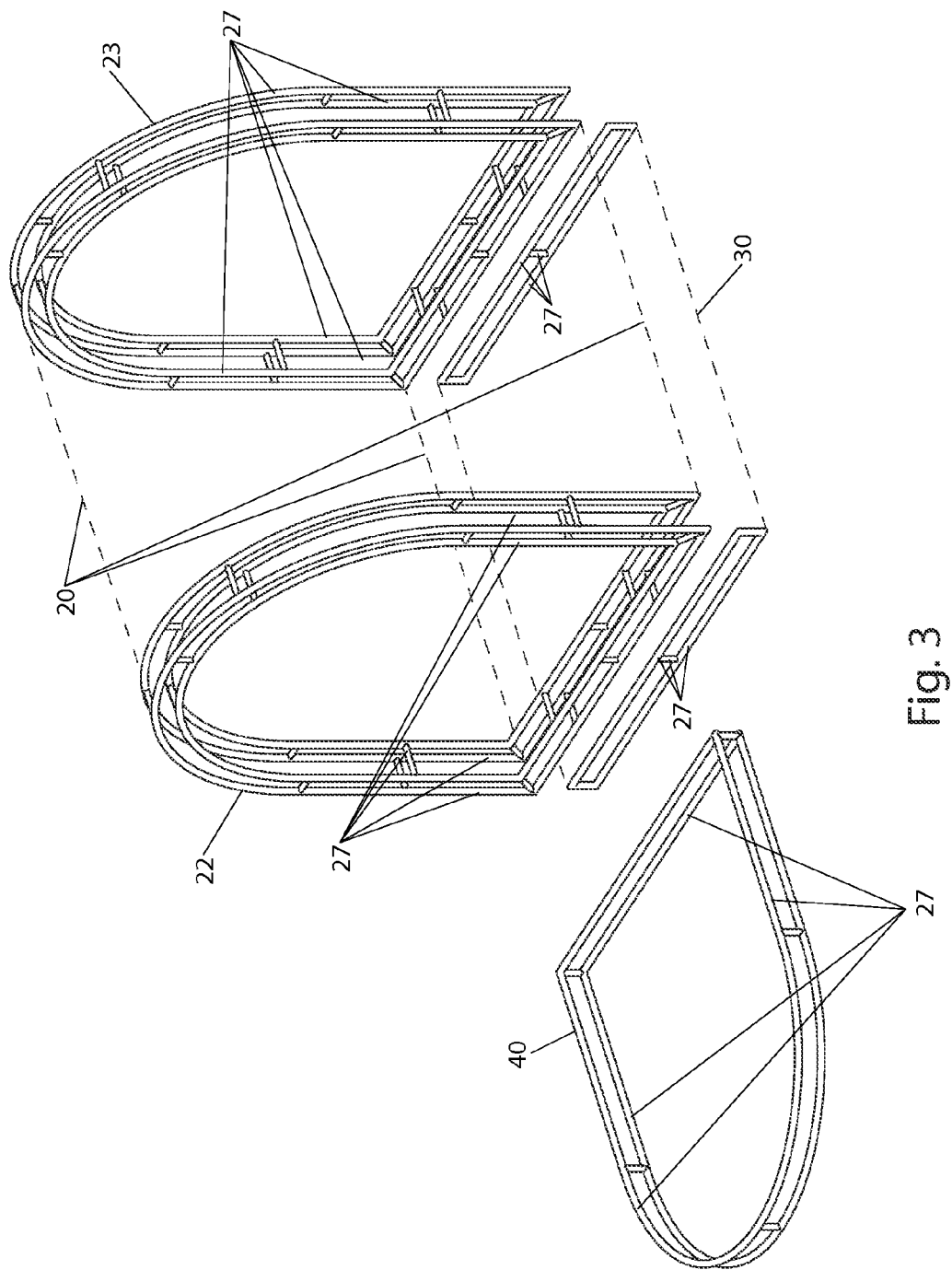

US 8,857,323 B1

PROTECTIVE DEVICE FOR PREVENTING FLARE-UPS FROM CONTACTING FOOD DURING COOKING

RELATED APPLICATIONS

The present invention was first described in and claims the benefit of U.S. Provisional Application No. 61/431,184 filed on Jan. 10, 2011, the entire disclosures of which are incorporated herein by reference.

FIELD OF THE INVENTION

The present invention relates generally to cooking foil, and in particular, to a cooking foils enclosure.

BACKGROUND OF THE INVENTION

Cooking food in a manner which drains the unwanted and unhealthy fat away from the food is a practice commonly utilized. Carcinogenic smoke emitted from burning the fat during grilling, broiling, or other cooking processes is a common outcome to cooking in this manner. Various ways to deal with carcinogenic smoke during cooking are known and various ways to deal with draining unwanted fat are known.

Various attempts have been made to provide cooking enclosures. Examples of these attempts can be seen by reference to several U.S. patents. U.S. Pat. No. 4,958,618, issued in the name of Davidson, describes a portable cooking apparatus.

U.S. Pat. No. 4,969,449, issued in the name of Levin, describes a disposable foil grill.

U.S. Patent No. 2008/0,056,624, issued in the name of Chudley, describes a sealable bag for cooking upon a heating appliance.

While these devices fulfill their respective, particular objectives, each of these references suffer from one (1) or more disadvantages. Many such devices are only suited for draining fat from foods. Others are only suited to protect the food from carcinogens. Accordingly, there exists a need for cooking enclosure without the disadvantages as described above. The development of the present invention substantially departs from the conventional solutions and in doing so fulfills this need.

SUMMARY OF THE INVENTION

The inventor has recognized the aforementioned inherent problems and lack in the art and observed that there is a need for a cooking enclosure.

Accordingly, it is an object of the present embodiments of the invention to solve at least one (1) of these problems. The inventor has addressed this need by developing cooking enclosure which drains the fat from the food and also limits absorption from the carcinogenic smoke.

To achieve the above objectives, it is an object of the present invention to provide a cooking enclosure.

Another object of the present invention is to provide the cooking enclosure with an enclosure having an interior space to receive foodstuffs and to retain heat.

Yet still another object of the present invention is to provide the enclosure with a base, a wall structure, a front archway, a rear panel, and a door.

Yet still another object of the present invention is to provide the door with a means to be inserted within a lip portion for support when in a closed position.

Yet still another object of the present invention is to provide the door with a door notch which engages a door latch for closure.

Yet still another object of the present invention is to provide the base with a plurality of drainage apertures which allow fat to drain and inhibit carcinogens.

Yet still another object of the present invention is to provide the base and wall structure with a plurality of wall folds lines and base fold lines.

Yet still another object of the present invention is to provide a method of utilizing the device that provides a unique means of expanding the enclosure, separating the front archway and rear panel portions, Further objects and advantages of the present invention will become apparent from a consideration of the drawings and ensuing description, placing the cooking enclosure on a cooking appliance or surface, opening the door to place foodstuffs within the cooking enclosure.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
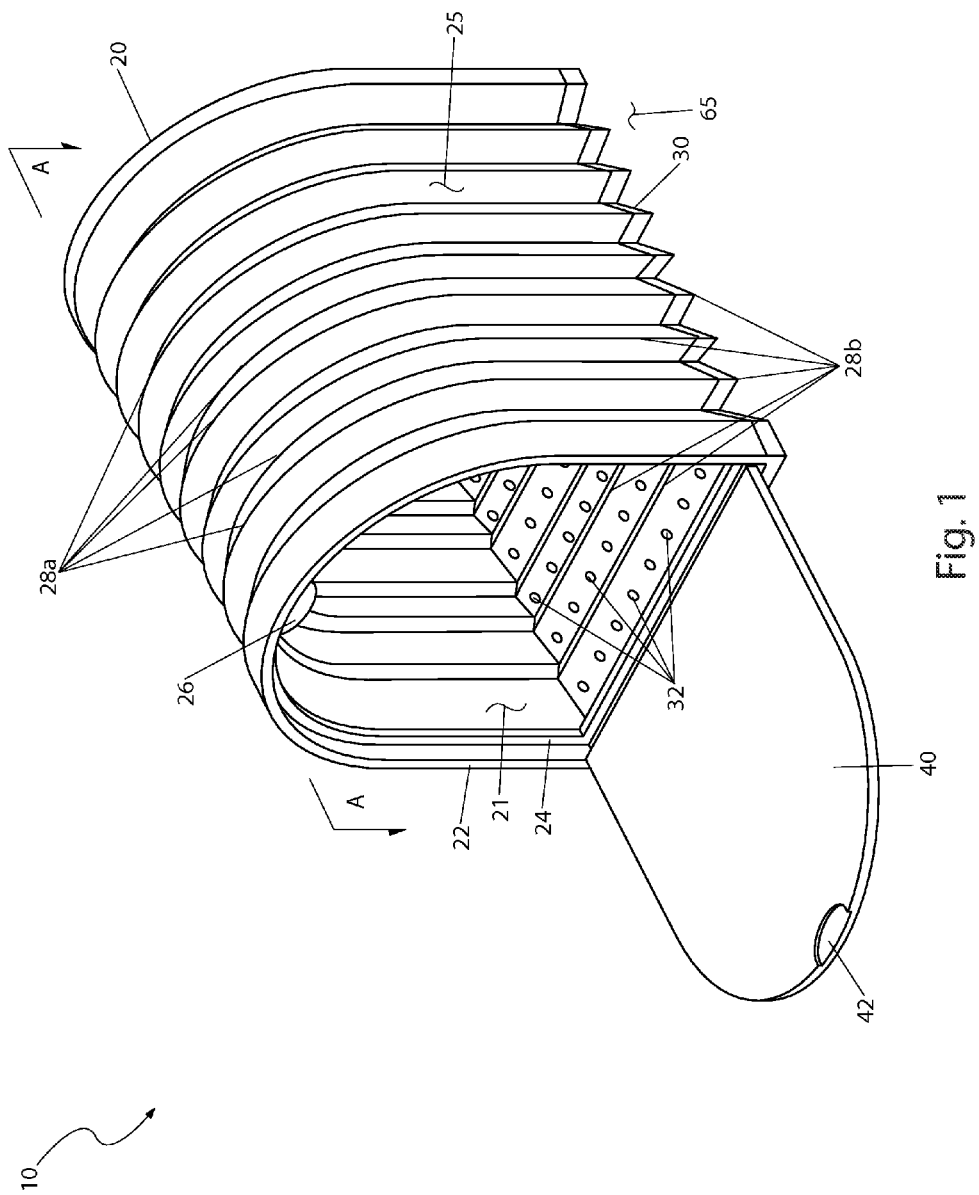
FIG. 1 depicts a perspective view of a protective cooking device 10, according to a preferred embodiment of the present invention.

DESCRIPTIVE KEY 10 protective cooking device
20 enclosure
21 interior space
22 front archway
23 rear panel
24 lip
25 wall structure
26 door latch
27 wire frame
28a wall fold
28b base fold
30 base
32 drainage aperture
40 door
42 door notch
44 grip
50 filler material
52 hinging edge feature
60 foodstuff
65 cooking surface

DETAILED DESCRIPTION OF THE PREFERRED EMBODIMENT

Figure 2:
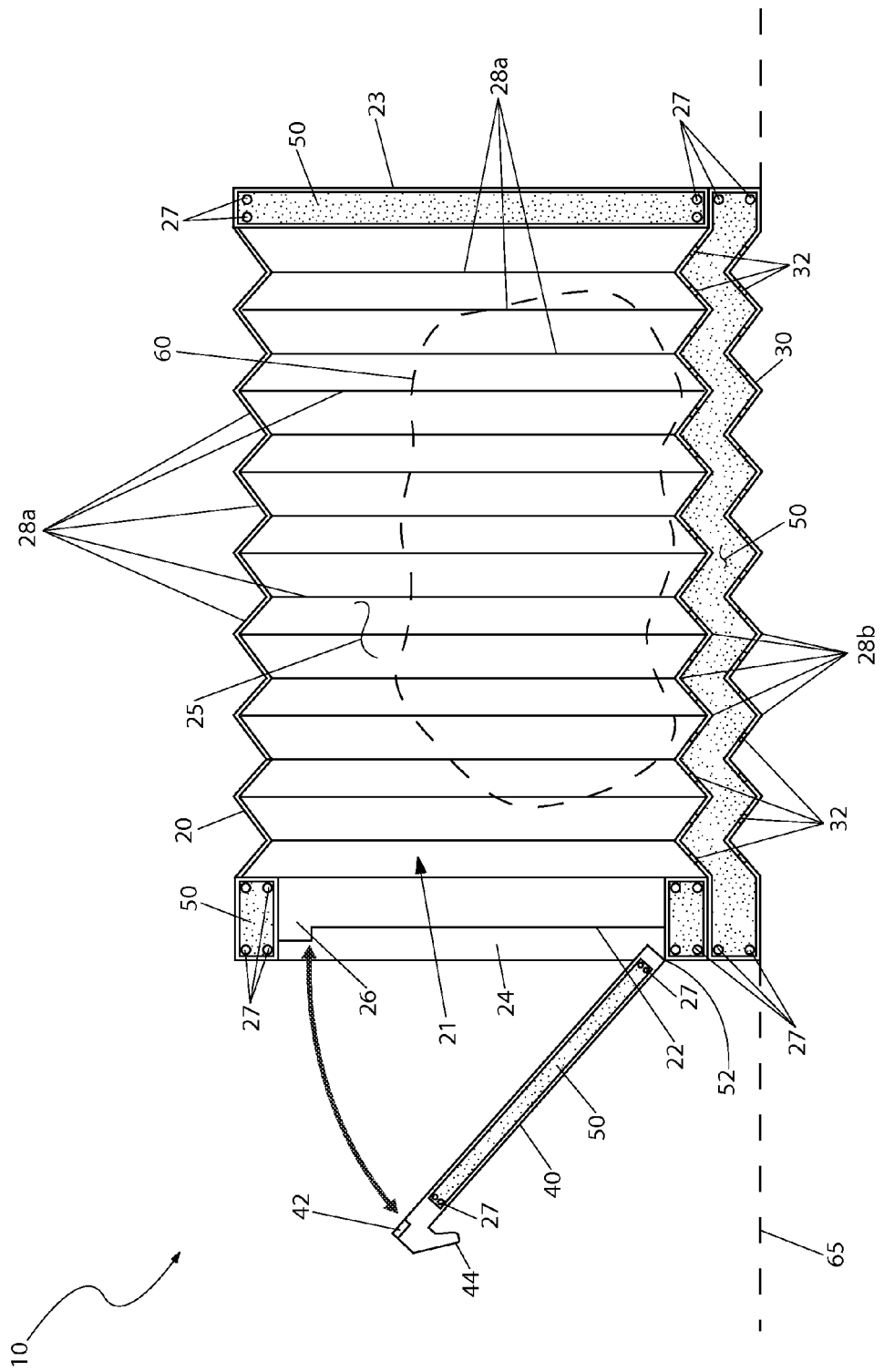
FIG. 2 depicts a longitudinal section view of the protective cooking device 10 taken along section line A-A (see FIG. 1), according to a preferred embodiment of the present invention; and, FIG. 3 is an isolated view of wire frame portions 27 of the protective cooking device 10, according to a preferred embodiment of the present invention.

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a protective cooking device (herein described as the "device") 10, which provides a metallic foil grilling enclosure 20 which protects meats and other foodstuffs 60 from absorbing carcinogenic smoke emitted from burning fat during grilling, broiling, or other cooking processes while allowing said fat to drain away from said foodstuffs 60.

Referring now to FIG. 1, a perspective view of the device 10, according to a preferred embodiment of the present invention, is disclosed. The device 10 is preferably intended for grilling or broiling meats or other foodstuffs 60. The device 10 includes an enclosure 20 defining an interior space 21 for receiving said foodstuffs 60 and retaining heat provided by a subjacent cooking surface 65 or appliance. The enclosure 20 provides a closed structure comprising a base 30, an upwardly arching wall structure 25, an open front archway 22, a solid rear panel 23, and a door 40. The enclosure 20 is envisioned to comprise approximate dimensions of twelve (12) inches in width, ten (10) inches in depth, and ten (10) inches in height; however, it is understood that the device 10 may be introduced in a variety of sizes based upon particular foodstuffs 60 to be cooked, and as such should not be interpreted as a limiting factor of the device 10.

The door 40 comprises a flat arched-shape structure corresponding to an inner perimeter opening of the front archway 22, thereby enabling snug insertion within a lip portion 24 of said front archway portion 22 to support and secure the door 40. The base 30 provides spacing between the foodstuffs 60 and the cooking surface 65 while allowing fat and other liquids to drain from the foodstuffs 60 during a cooking process via a plurality of drainage apertures 32. The enclosure 20 includes an elongated arch-shaped profile and is preferably constructed of a semi-flexible aluminum foil material which provides efficient thermal conduction and a safe cooking container. The enclosure 20 includes an open front archway 22 along an end portion and an opposing solid rear panel 23.

The enclosure 20 preferably comprises an assembly of aluminum panels and wire frame portions 27 being assembled using common metal joining processes such as, but not limited to: various welding processes, adhesives, soldering, crimping, and the like, to form a unitary structure. Bottom edge portions of the previously mentioned wall structure 25 are affixed to respective outer edges of the base 30. The open front archway 22 and rear panel 23 portions are constructed using a rigid internal metal wire frame 27 being covered over by an aluminum foil material (see FIG. 3). Furthermore, said front archway 22 and rear panel 23 portions are interconnected via attachment to respective edge portions of the wall structure 25. The front archway 22 further includes a lip 24 which protrudes inwardly perpendicularly from the interior perimeter of the front archway 22 in order to support and prevent the door 40 from moving into an interior space 21 of the enclosure 20.

The front archway 22 comprises a door latch 26 at a top center location along an inner edge. The door latch 26 includes a convex protruding portion that allows a user to secure the door 40 within the front archway 22 by engaging said door latch 26 with a corresponding door notch portion 42 of said door 40. The door notch 42 comprises a corresponding concave profile which is retained within the latch 26 via a friction fit.

The base 30 and wall structure 25 portions comprise a plurality of aligned wall fold lines 28a and base fold lines 28b, respectively. The fold lines 28a, 28b allow the enclosure 20 to pivot and fold compactly inward, thereby selectively expanding and contracting the interior space 21 of the enclosure 20.

The base 30 of the device 10 includes a rectangular structure which supports the wall structure 25 and provides a spacing means between the interior space 21 of the device 10 and the cooking surface 65. The base 30 has a length and width corresponding to the bottom perimeter edges of said wall structure 25 being affixed along respective perimeter edges. The base 30 is constructed using semi-rigid aluminum panels formed around an inner filler material 50 and is capable of supporting approximately twenty pounds (20 lb) of foodstuffs 60 (see FIG. 2).

Referring now to FIG. 2, a longitudinal section view of the device 10 taken along section line A-A, according to a preferred embodiment of the present invention, is disclosed. The base 30 comprises a box-like structure preferably constructed of semi-rigid aluminum foil panels forming an interior volume containing a filler material 50. Said base 30 further comprises a plurality of drainage apertures 32 arranged in an equally-spaced manner along top and bottom surfaces. Each drainage aperture 32 is approximately one millimeter (1 mm) in diameter and arranged in a square matrix pattern with said drainage apertures 32 being approximately five millimeters (5 mm) center-to-center. The drainage apertures 32 are to be sized and spaced so as to provide effective drainage of fat particles and liquids away from the foodstuffs 60 during the cooking process. The base 30 allows said fat and drained liquids to flow out of the device 10 while inhibiting smoke from rising upward into the interior space of the device 10, possibly causing contact with, and/or absorption of, said smoke into said foodstuffs 60. Said filler material 50 provides drainage downwardly through the base 30 as well as internal structural integrity to support loading of the foodstuffs 60. Said filler material 50 is envisioned to comprise materials such as, but not limited to: roll-bonded clad metal, sintered metal, densely spun aluminum wire, or the like.

The fold line portions 28a, 28b of the base 30 and wall structure 25 portions are arranged in an equally-spaced and parallel manner extending in a lateral direction. Each fold line 28a, 28b allows the enclosure 20 to pivot and fold compactly inward along creases arranged in an alternating pattern such that the body 20 can be collapsed in an "accordion" manner for purposes of compact packaging and storage. The base fold lines 28b are spaced evenly along the length of the base 30 such that they are aligned with corresponding wall fold lines 28a.

The front archway 22 and rear panel 23 portions comprise semi-rigid structures comprising internal wire frame portions 27 positioned within corner portions and covered with aluminum foil panels. Said front archway 22 and rear panel 23 also contain a filler material 50 in a similar manner as the aforementioned base 30.

The door 40 provides similar construction as the front archway 22 and rear panel 23 portions comprising a metal wire frame 27 surrounded by aluminum foil panels and containing a filler material 50. Closing the door 40 isolates an interior space 21 of the enclosure 20, thereby preventing unwanted convective cooling of the interior space 21 during cooking. The door 40 further comprises an "L"-shaped protruding grip 44 at a top front edge which provides a means for a user to open the door 40 as desired. The respective foil coverings of the door 40 and front archway 24 are connected along bottom edges forming an integral hinging edge feature 52, thereby securing said door 40 to the enclosure 20.

Referring now to FIG. 3, an isolated view of wire frame portions 27 of the device 10, according to a preferred embodiment of the present invention, is disclosed. The open front archway 22 and rear panel 23 portions are constructed using a rigid internal metal wire frame 27 comprising parallel lengths of rigid wire being subsequently covered over using an aluminum foil material (see FIG. 1).

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of preparing the device 10 for use may be achieved by performing the following steps: procuring a model of the device 10 having desired overall dimensions and corresponding inner space 21 based upon an anticipated foodstuff 60 to be cooked; expanding the pre-collapsed enclosure 20 by grasping the front archway 22 and rear panel 23 portions using two (2) hands; separating said front archway 22 and rear panel 23 portions in an "accordion-style" manner to obtain a desired expanded inner space 21; placing the device 10 upon a cooking surface 65 or within a cooking appliance; and, opening the door 40 to receive the foodstuffs 60. The device 10 is now ready to be utilized to cook said foodstuffs 60.

The method of utilizing the device 10 to cook foodstuffs 60 may be achieved by performing the following steps: inserting foodstuffs 60 through the front archway 24; placing said foodstuff 60 upon the base portion 30; closing the door 40 by engaging the door latch 26 and door notch 42 portions; initiating a heat source portion of the cooking surface 65; allowing said fat and liquids produced from the foodstuffs 60 during the cooking process to drain downwardly through the drainage apertures 32 and away from said foodstuffs 60; isolating said foodstuffs 60 from smoke emitting from a subjacent cooking surface 65 such as a grill; allowing a period of time for the foodstuffs 60 to cook; opening the door 40 using the grip 44; and, removing said foodstuffs 60 from the device 10 for normal consumption.

Containment of the foodstuffs 60 within the enclosure 20 during the cooking process protects meats and other foodstuffs 60 from absorbing carcinogenic smoke emitted from burning fat within a grill, broiler, or other cooking device, while allowing said fat to drain away from said foodstuffs 60.

The device 10 is intended to provide various benefits to a user over existing methods of cooking foodstuffs 60 on a cooking surface 65 such as a grill. The device 10 is collapsible for compact packaging and storage. The device 10 is readily accessible and sealable using the door 40. The device 10 can be utilized on any horizontal cooking surface. The device 10 provides drainage of fat and other liquids while preventing carcinogenic smoke from contacting foodstuffs 60 during cooking.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A protective cooking device, comprising:
    an expandable frame assembly, comprising a front archway frame portion, a rear frame portion, a front base frame portion, and a rear base frame portion; and,
    an enclosure assembly surrounding said frame assembly and supported thereby, further comprising a rear wall, an upwardly arching side wall, a front opening, a door located at said front opening opposite said rear wall, a base spanning a length between said rear wall and said door, an interior floor superjacent from said base and coextensive therewith, a plurality of first drain apertures located on said interior floor, and a plurality of second drain apertures located on said base;
    wherein said frame assembly selectively expands a length of said device;
    wherein said door is hingedly attached to said base and provides access to an interior of said enclosure;
    wherein said interior of said enclosure is adapted to receive foodstuffs placed therein;
    wherein rendered fluid passes through said plurality of first drain apertures and collects within said base; and,
    wherein said fluid drains away from said enclosure through said second plurality of drain apertures.

2. The device of claim 1, wherein said frame assembly further comprises a rigid metal wire frame.

3. The device of claim 2, wherein said front archway comprises lip around an inner perimeter thereof;
    wherein said lip prevents inward travel of said door.

4. The device of claim 3, wherein said base, said interior floor, and said side wall further comprises a plurality of parallel fold lines;
    wherein said plurality of side wall fold lines, said plurality of interior floor fold lines, and said plurality of base fold lines are aligned; and,
    wherein said plurality of fold lines provides assistance to said enclosure when selectively expanded or contracted.

5. The device of claim 3, wherein said base, said door, said front archway frame portion, and said rear frame portion further comprises a filler material.

6. The device of claim 5, wherein said filler material consists of one of the following list: roll-bonded clad metal, sintered metal, and densely spun aluminum wire.

7. The device of claim 3, wherein said door further comprises a securing means for securing said door to said front archway frame portion and a grasping means for assisting in opening and closing said door relative to said front archway frame portion.

8. The device of claim 3, wherein each of said plurality of first drain apertures and said plurality of second drain apertures is 1 mm in diameter.

9. The device of claim 3, wherein said plurality of first drain apertures and said plurality of second drain apertures are arranged in a square matrix pattern with individual drainage apertures being spaced approximately 5 mm center-to-center.

10. The device of claim 3, wherein said enclosure assembly further comprises a width of twelve inches, a depth of ten inches, and a height of ten inches.

11. The device of claim 3, wherein said enclosure assembly further comprises a metallic foil material comprising a semi-rigid structure.

12. The device of claim 11, wherein said base, said interior floor, and said side wall further comprises a plurality of parallel fold lines;

wherein said plurality of fold lines of said side wall, said interior floor, and said base fold lines are aligned; and, wherein said plurality of fold lines provides assistance to said enclosure when selectively expanded or contracted.

13. The device of claim 11, wherein said base, said door, said front archway frame portion, and said rear frame portion further comprises a filler material.

14. The device of claim 13, wherein said filler material consists of one of the following list: roll-bonded clad metal, sintered metal, and densely spun aluminum wire.

15. The device of claim 11, wherein said door further comprises a securing means for securing said door to said front archway frame portion and a grasping means for assisting in opening and closing said door relative to said front archway frame portion.

16. The device of claim 11, wherein each of said plurality of first drain apertures and said plurality of second drain apertures is 1 mm in diameter.

17. The device of claim 11, wherein said plurality of first drain apertures and said plurality of second drain apertures are arranged in a square matrix pattern with individual drainage apertures being spaced approximately 5 mm center-to-center.

18. The device of claim 11, wherein said enclosure assembly further comprises a width of twelve inches, a depth of ten inches, and a height of ten inches.

\* \* \* \* \*